United States Patent
Manousakas

(10) Patent No.: US 9,256,942 B1
(45) Date of Patent: Feb. 9, 2016

(54) METHOD FOR DETERMINING VARIATIONS AMONG MULTIPLE THREE-DIMENSIONAL STONE IMAGES EXTRACORPOREALLY AND COMPUTER PROGRAM USING THE SAME

(71) Applicant: LITE-MED INC., Taipei (TW)

(72) Inventor: Ioannis Manousakas, Kaohsiung (TW)

(73) Assignee: Lite-Med Inc., Taipei (TW)

( * ) Notice: Subject to any disclaimer, the term of this patent is extended or adjusted under 35 U.S.C. 154(b) by 0 days.

(21) Appl. No.: 14/516,838

(22) Filed: Oct. 17, 2014

(51) Int. Cl.
- G06K 9/00 (2006.01)
- G06T 7/00 (2006.01)
- G06T 7/40 (2006.01)

(52) U.S. Cl.
CPC .............. G06T 7/0016 (2013.01); G06T 7/401 (2013.01); *G06T 2207/10136* (2013.01); *G06T 2207/30084* (2013.01)

(58) Field of Classification Search
USPC .................................................. 382/128, 131
See application file for complete search history.

(56) References Cited

U.S. PATENT DOCUMENTS

| | | | | |
|---|---|---|---|---|
| 4,942,878 A | * | 7/1990 | Dory .................. | A61B 17/2256 600/439 |
| 6,263,231 B1 | * | 7/2001 | Reitter ................ | A61B 6/12 128/922 |
| 2007/0025510 A1 | * | 2/2007 | Buchholtz ........... | A61B 6/12 378/65 |
| 2007/0249933 A1 | * | 10/2007 | Krauss ................ | A61B 5/4869 600/425 |
| 2008/0091125 A1 | * | 4/2008 | Owen .................. | A61B 7/2256 601/4 |
| 2014/0307079 A1 | * | 10/2014 | Aragaki .............. | G06T 7/0083 348/79 |
| 2015/0031992 A1 | * | 1/2015 | Monga ................ | A61B 6/5217 600/425 |
| 2015/0199996 A1 | * | 7/2015 | Krishnamurthy .. | G11B 27/3081 386/241 |
| 2015/0313444 A1 | * | 11/2015 | Wolf ................... | A61B 1/00009 600/103 |
| 2015/0320433 A1 | * | 11/2015 | Navve ................. | A61B 17/2256 606/2.5 |

OTHER PUBLICATIONS

Albregtsen, Statistical Texture Measures Computed from Gray Level Coocurrence Matrices, Nov. 2008, pp. 1-14.*

* cited by examiner

*Primary Examiner* — John Strege
(74) *Attorney, Agent, or Firm* — Rosenberg, Klein & Lee

(57) ABSTRACT

A method for determining variations among multiple three-dimensional stone images extracorporeally and a computer program product using the method are disclosed. The method involves during a lithotripsy process performed on a human body, multiple three-dimensional stone images taken from a stone location in the human body are processed outside the human body using the following steps: using a processing unit to execute a computing process for the multiple three-dimensional stone images one by one in an order from the first taken said image to the last taken said image, wherein the computing process involves using an entropy texture equation or an inverse difference moment (IDM) texture equation to calculate a texture feature value for each said three-dimensional stone image; and when the texture feature values calculated using the entropy texture equation or the inverse difference moment (IDM) texture equation substantively stop changing, making the processing unit output a prompt signal.

4 Claims, 5 Drawing Sheets

--- using a processing unit to execute a computing process for the multiple three-dimensional stone images one by one in an order from the first taken said image to the last taken said image, wherein the computing process involves using an entropy texture equation or an inverse difference moment (IDM) texture equation to calculate a texture feature value for each said three-dimensional stone image, in which the entropy texture equation is defined as $E = -\sum_{i,j} P(i,j) \log P(i,j)$, and the inverse difference moment (IDM) texture equation is defined as $IDM = \sum_{i,j} \frac{P(i,j)}{1+(i-j)^2}$, where $P(i,j) = \frac{C(i,j)}{\sum_{i,j} C(i,j)}$, and i, j are image grayscale pixel values, and C(i, j) is a number of appearances of (i, j) whenever a combination of a pitch d and an angle θ between pixels exists;

↓ when the texture feature values calculated using the entropy texture equation or the inverse difference moment (IDM) texture equation substantively stop changing, making the processing unit output a prompt signal.

using a processing unit to execute a computing process for the multiple three-dimensional stone images one by one in an order from the first taken said image to the last taken said image, wherein the computing process involves using an entropy texture equation or an inverse difference moment (IDM) texture equation to calculate a texture feature value for each said three-dimensional stone image, in which the entropy texture equation is defined as $E = -\sum_{i,j} P(i,j) \log P(i,j)$, and the inverse difference moment (IDM) texture equation is defined as $IDM = \sum_{i,j} \frac{P(i,j)}{1+(i-j)^2}$, where $P(i,j) = \frac{C(i,j)}{\sum_{i,j} C(i,j)}$, and i, j are image grayscale pixel values, and C(i, j) is a number of appearances of (i, j) whenever a combination of a pitch d and an angle θ between pixels exists;

when the texture feature values calculated using the entropy texture equation or the inverse difference moment (IDM) texture equation substantively stop changing, making the processing unit output a prompt signal.

FIG. 1

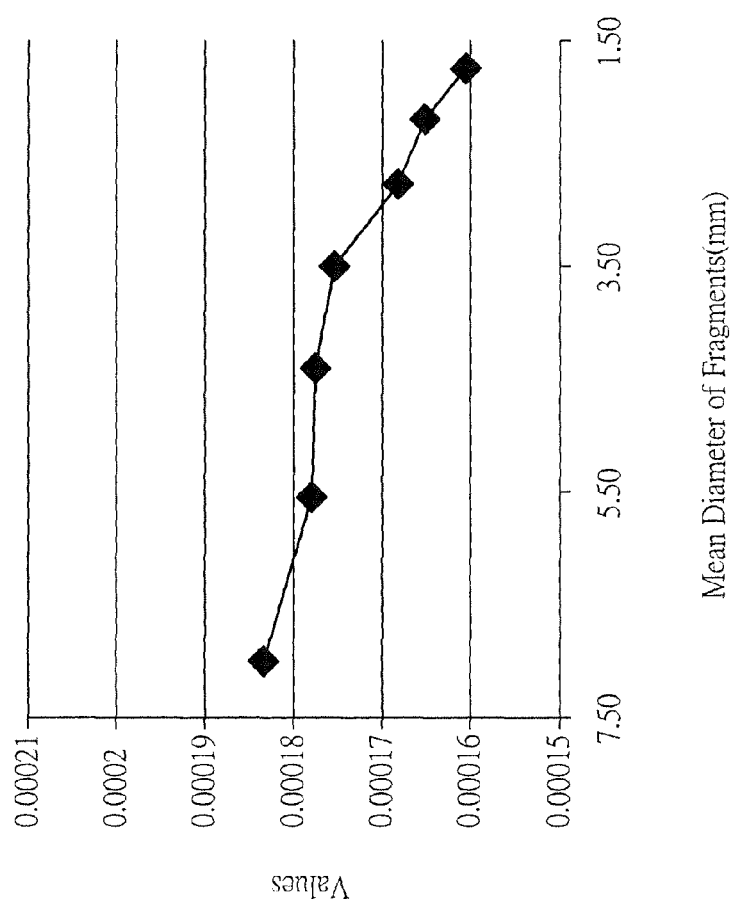
F I G . 5

METHOD FOR DETERMINING VARIATIONS AMONG MULTIPLE THREE-DIMENSIONAL STONE IMAGES EXTRACORPOREALLY AND COMPUTER PROGRAM USING THE SAME

BACKGROUND OF THE INVENTION

1. Technical Field

The present invention relates to a method for determining variations among multiple three-dimensional stone images extracorporeally, and more particularly to a method involving computing texture feature values of multiple three-dimensional stone images and determining variations among the images according to the texture feature values, and to a computer program using this method.

2. Description of Related Art

Wealth has a tendency to make people have high-oil, high-protein and refined diets, which are adverse to physical health and may incur illness. Among the most affected organs are kidneys that serve to remove waste products of metabolism from the human body. Kidneys are essential in the urinary system, and responsible for filtering out impurities from blood, maintaining fluid-electrolyte balance, and at last producing urine that then leaves the body through the urinary system. One of the commonest disorders seen in kidneys is nephrolithiasis, which refers to having minerals contained in urine crystallizing and accumulating in kidneys as stones. These stones may be as small as sand particles, or as large as golf balls. When moving into the ureters, the small ones may be discharged with urine and those having a diameter of several millimeters may clog the ureters and block urine discharge, causing intense loin pain that may sometimes extend to the hypogastrium or the groin.

One effective treatment for kidney stones is extracorporeal shock wave lithotrity, which only has minimal harm to the body and is usually non-hospitalizing. For the stones not fragmented by shock waves, a laparoscope treatment, i.e. using an ureterorenoscope, is typically effective. Only a small minority of patients need to be treated through the traditional open surgery as their stones are too large. Yet the traditional open surgery has its advantage that is ensuring the stones to be completely taken out.

The conventional extracorporeal shock wave lithotrity has the following shortcomings:

1. During the treatment, the real-time situation of stone fragmentation in the body is unavailable. The health care professional can only refer to X-ray or ultrasonic images before the operation to determine the size and location of the stones, and after a certain duration of operation, decide when to end the shock wave lithotrity depending on his/her experience.

2. During the treatment, the patient's kidneys and the stones therein can move as the patient breathes, bringing about uncertainty to the effect of the lithotripsy. In the event that the stone fragmentation is insufficient, the through-urethra discharge of the stones may fail, and causes additional pain and hydronephrosis to the patient.

For tracing kidney stones more effectively throughout the process of the shock wave lithotrity despite the displacement of the kidneys, the inventor of the present invention has invented a 3D ultrasonic image tracing system for extracorporeal shock wave lithotripters, which is now granted as Taiwan Patent No. 1414267. The prior-art invention involves building a patient's 3D ultrasonic stone image database in a computer system by using a 2D ultrasonic scanner to acquire ultrasonic image slices of the patient's stones and reorganizing theses 2D ultrasonic image slices. The 3D ultrasonic image database so built is then used as a reference database for the 3D tracing system. During the later lithotripsy treatment, the real-time 2D ultrasonic stone image slices are compared with the 3D ultrasonic stone image database for correlation analysis and location determining, so as to accurately focus the shock waves on the patient's stones and thereby ensure the effectiveness of the lithotripsy treatment. However, while the prior-art invention only proposes how to effectively trace the location of the stones in a patient's body, there is no mention about using the built 3D ultrasonic stone images for further analysis.

SUMMARY OF THE INVENTION

Although three-dimensional scanners have been implemented in the current clinic treatment for nephrolithiasis to reveal the intracroporeal situation of the treated patients, due to the limit of the current imaging technology, physicians have no way to determine stone fragmentation extracorporeally using three-dimensional images.

For addressing the foregoing shortcomings, the inventor of the present invention has developed a method for determining variations among multiple three-dimensional stone images extracorporeally. According to the disclosed method, during a lithotripsy process performed on a human body, multiple three-dimensional stone images taken from a stone location are processed outside the human body using the following steps: using a processing unit to execute a computing process for the multiple three-dimensional stone images one by one in an order from the first taken said image to the last taken said image, wherein the computing process involves using an entropy texture equation or an inverse difference moment (IDM) texture equation to calculate a texture feature value for each said three-dimensional stone image, in which the entropy texture equation is defined as $E = -\Sigma_{i,j} P(i,j) \log P(i,j)$, and the inverse difference moment (IDM) texture equation is defined as $$IDM = \sum_{i,j} \frac{P(i,j)}{1 + (i-j)^2},$$

where $$P(i,j) = \frac{C(i,j)}{\sum_{i,j} C(i,j)},$$

and i, j are image grayscale pixel values, and C(i, j) is a number of appearances of (i, j) whenever a combination of a pitch d and an angle θ between pixels exists; and when the texture feature values calculated using the entropy texture equation or the inverse difference moment (IDM) texture equation substantively stop changing, making the processing unit output a prompt signal.

The present invention also provides a computer program product, which installs an application on a computer, and makes the computer execute the above-mentioned method for determining variations among multiple three-dimensional stone images extracorporeally.

Therein, each of the three-dimensional stone images is constructed from multiple preciously taken two-dimensional ultrasonic images, and an effective area is selected in each of the three-dimensional stone images for being processed by said computing process.

The disclosed method and the disclosed computer program using the method for determining variations among multiple three-dimensional stone images extracorporeally have the following benefits:

1. Even if the kidney stones move as the patient breathes, the stones can be still scanned for producing two-dimensional ultrasonic images that are instantly converted into three-dimensional stone images, so that the stones can be accurately located throughout the operation.

2. By using the entropy texture equation or the inverse difference moment (IDM) texture equation to perform calculation on the multiple three-dimensional stone images having different levels of stone fragmentation, and using the obtained texture feature values to determine whether a predetermined condition is satisfied, it is possible to identify the variations among the three-dimensional stone images, and use the variations as a reference for when to stop applying shock waves. This helps to ensure the achieved stone fragmentation is great enough to allow the fragments to be discharged through the urethras, and prevent future recurrence. This is also useful to prevent excessive application of the lithotripsy after the desired stone fragmentation is accomplished. Otherwise, excessive shock waves applied to the patient's body may cause adverse side effects, or even worse, cause renal atrophy or uremia.

BRIEF DESCRIPTION OF THE DRAWINGS

FIG. 1 is a flowchart of a method for determining variations among multiple three-dimensional stone images extracorporeally according to the present invention.

FIG. 5 is a graph displaying texture feature values with respect to different levels of stone fragmentation shown in the three-dimensional stone images, wherein the texture feature values are obtained using an inverse difference moment (IDM) texture equation according to the present invention.

DETAILED DESCRIPTION OF THE INVENTION

Figure 2:
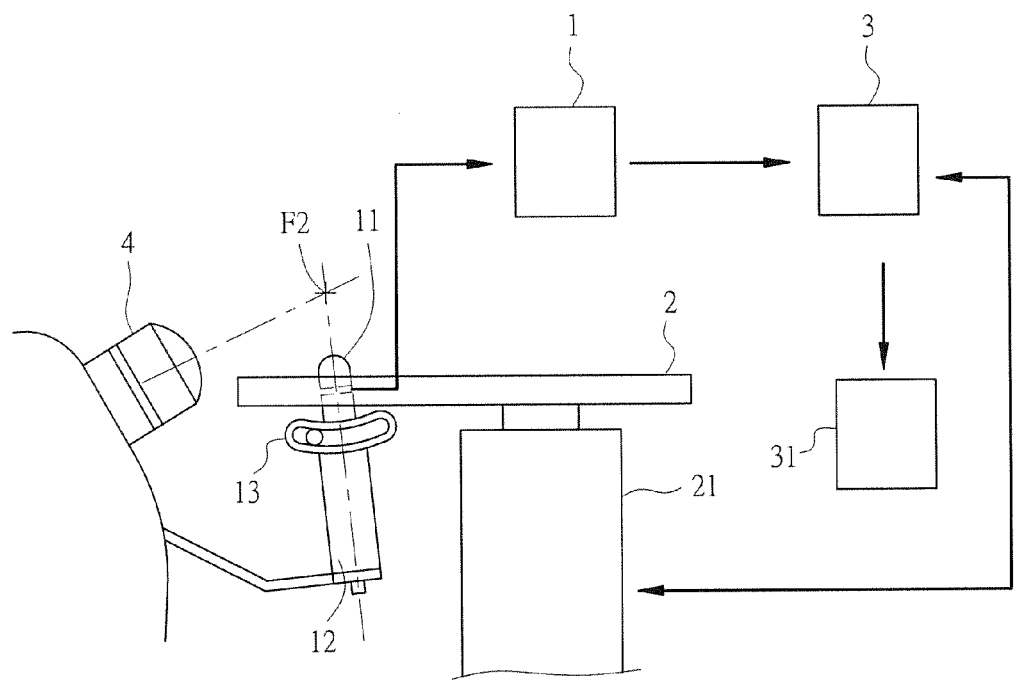
FIG. 2 is a scheme drawing of medical equipment used for performing the method of FIG. 1.

The present invention provides a method for determining variations among multiple three-dimensional stone images extracorporeally, wherein the three-dimensional stone images are processed extracorporeally to produce texture feature values, and these texture feature values are used to determine variations among the three-dimensional stone images. While the embodiment described below is about medical treatment for lithiasis, the disclosed method only involves using the texture feature values to determine the variations among the three-dimensional stone images, and is not intended to assess the treatment for kidney stones directly. In other words, the information obtained using the disclosed method is only intermediate results, not diagnostic results of lithiasis.

Please refer to FIG. 1, which is flowchart of a method for determining variations among multiple three-dimensional stone images extracorporeally according to the present invention. According to the disclosed method, during a lithotripsy process performed on a human body, multiple three-dimensional stone images taken from a stone location are processed outside the human body using the following steps:

A. using a processing unit to execute a computing process for the multiple three-dimensional stone images one by one in an order from the first taken said image to the last taken said image, wherein the computing process involves using an entropy texture equation or an inverse difference moment (IDM) texture equation to calculate a texture feature value for each said three-dimensional stone image, in which the entropy texture equation is defined as $E=-\Sigma_{i,j}P(i,j)\log P(i,j)$, and the inverse difference moment (IDM) texture equation is defined as $$IDM = \sum_{i,j} \frac{P(i, j)}{1 + (i - j)^2},$$

where $$P(i, j) = \frac{C(i, j)}{\sum_{i,j} C(i, j)},$$

and i, j are image grayscale pixel values, and C(i, j) is a number of appearances of (i, j) whenever a combination of a pitch d and an angle θ between pixels exists; and B. using the processing unit to execute an examining process, wherein the examining process involves reading the texture feature values of the multiple three-dimensional stone images obtained by using the entropy texture equation or the inverse difference moment (IDM) texture equation, in which the texture feature values obtained using the entropy texture equation are in direct proportion to the levels of stone fragmentation, and the texture feature values obtained using the inverse difference moment (IDM) texture equation are in inverse proportion to the levels of stone fragmentation, and when the texture feature values calculated using the entropy texture equation or the inverse difference moment (IDM) texture equation substantively stop changing, making the processing unit output a prompt signal.

Therein, each of the three-dimensional stone images is constructed from multiple two-dimensional ultrasonic images taken from the stones. In each of the three-dimensional stone images, an effective area is selected for the processing unit to execute the foregoing computing process.

Now please refer to FIG. 2, which schematically depicts an embodiment of equipment for determining levels of stones fragmentation from three-dimensional stone images according to the present invention. The equipment comprises an ultrasonic scanner (1), a bed (2), a processing unit (3), a monitor (31) connected to the processing unit (3), and a shock-wave generating device (4).

The ultrasonic scanner (1) is arranged around the bed (2), and comprises an ultrasonic probe (11), a first moving mechanism (12), and a second moving mechanism (13). With the first moving mechanism (12) and the second moving mechanism (13), the ultrasonic probe (11) can be moved to any image-capturing position. Then the ultrasonic probe (11) can scan the patient and capture images that are transmitted to the processing unit (3).

The bed (2) allows a patient to lie thereon. The bed (2) includes a sliding platform (21) that is controlled by the processing unit (3), so that the bed (2) can move.

The processing unit (3) serves to receive the images from the ultrasonic scanner (1), use these images to construct a three-dimensional stone image, and display the three-dimensional stone image through the monitor (31).

The shock-wave generating device (4) applies shock waves to a stone location (F2) on the patient's body for lithotripsy treatment.

Referring to FIG. 1 and FIG. 2, the disclosed method for determining variations among multiple three-dimensional stone images extracorporeally, when working with the medical equipment described above, is performed as follows.

First, a health care professional uses the ultrasonic scanner (1) to scan the patient receiving the extracorporeal shock wave lithotrity and take multiple two-dimensional ultrasonic images after every time of application of shock wave. Then the health care professional operates the processing unit (3) to use the multiple two-dimensional ultrasonic images to construct plural three-dimensional stone images representing different levels of stone fragmentation. Therein, the way for obtaining the two-dimensional ultrasonic image slices may be horizontal scanning, arc scanning, helical scanning or vertical scanning.

Figure 3:
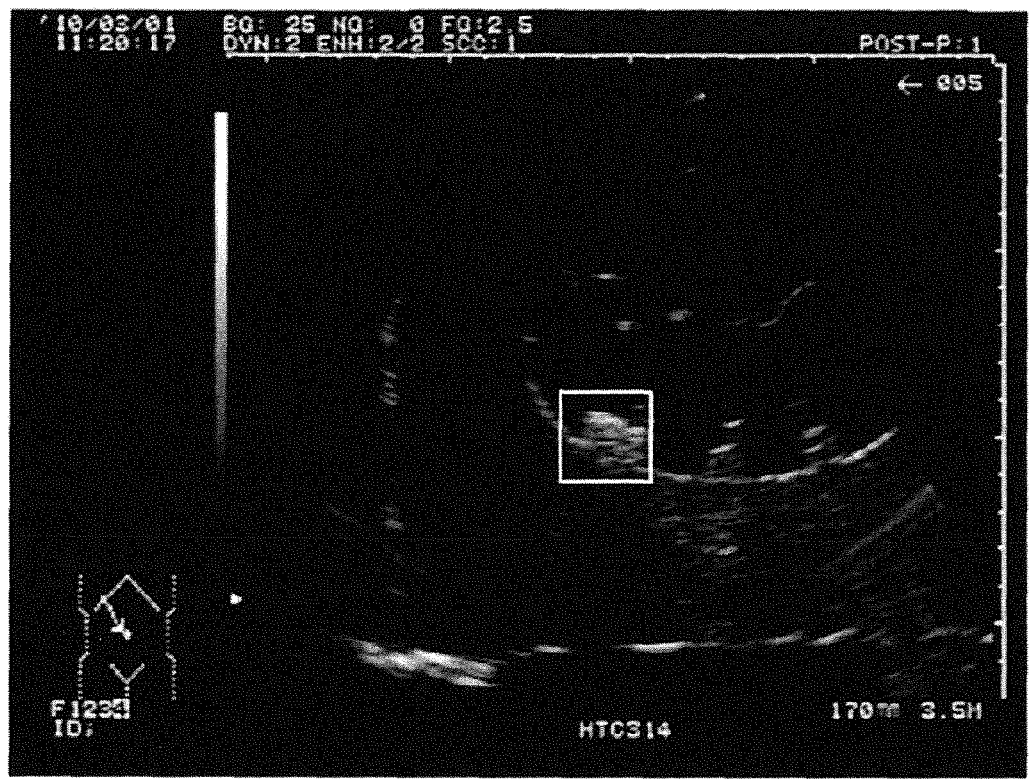
FIG. 3 is a three-dimensional (3D) stone image as adopted in the present invention.

Afterward, the processing unit (3) selects an effective area form each of the three-dimensional stone images according to the location of the patient's stones. FIG. 3 provides an example of such selection.

After the effective area is determined, the processing unit (3) executes a computing process outside the patient's body to the effective areas of the three-dimensional stone images. The computing process involves using an entropy texture equation or an inverse difference moment (IDM) texture equation for calculating a texture feature value of each of the three-dimensional stone images. The entropy texture equation is defined as $E=-\Sigma_{i,j}P(i,j)\log P(i,j)$, and the inverse difference moment (IDM) texture equation is defined as $$IDM = \sum_{i,j} \frac{P(i, j)}{1+(i-j)^2},$$

where $$P(i, j) = \frac{C(i, j)}{\sum_{i,j} C(i, j)},$$

and i, j are image grayscale pixel values, and C(i, j) is a number of appearances of (i, j) whenever a combination of a pitch d and an angle θ between pixels exists.

Figure 4:
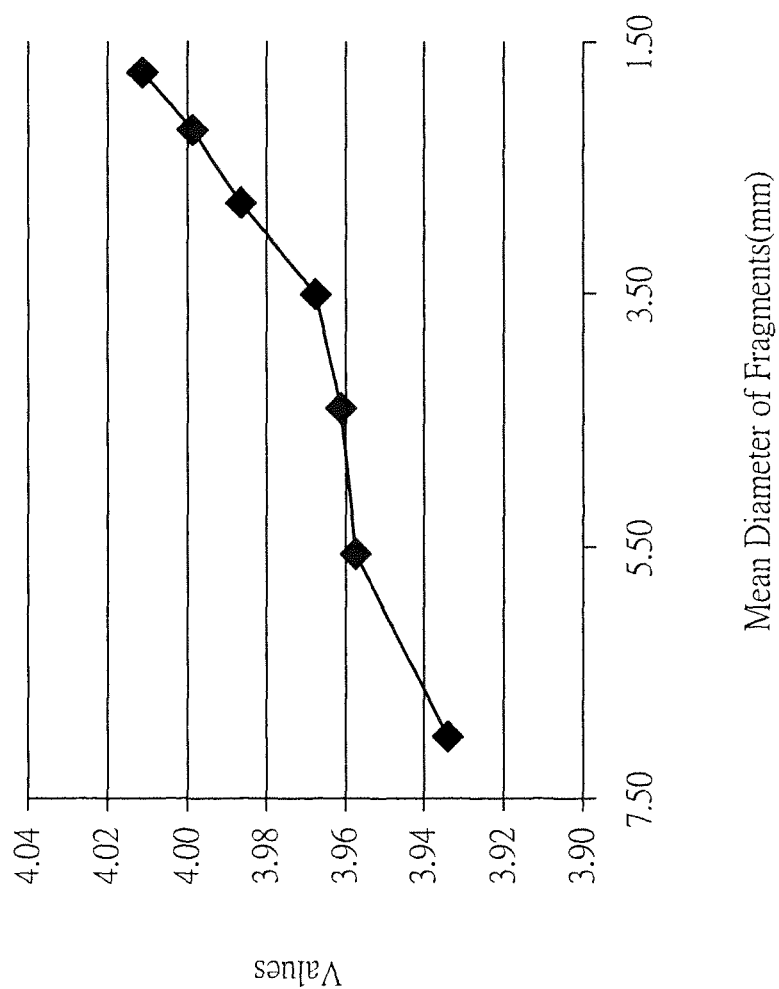
FIG. 4 is a graph displaying texture feature values with respect to different levels of stone fragmentation shown in the three-dimensional stone images, wherein the texture feature values are obtained using an entropy texture equation according to the present invention.

FIG. 4 is a graph displaying texture feature values with respect to different levels of stone fragmentation shown in the three-dimensional stone images, wherein the texture feature values are obtained using the entropy texture equation according to the present invention. As shown, as the level of stone fragmentation increase, the texture feature values regularly increase. When in the examining process it is determined that the texture feature values produced using the entropy texture equation show no more changes, the processing unit (3) gives out a prompt signal.

Alternatively, as shown in FIG. 5, which is a graph displaying texture feature values with respect to different levels of stone fragmentation shown in the three-dimensional stone images, wherein the texture feature values are obtained using the inverse difference moment (IDM) texture equation according to the present invention, when the level of stone fragmentation increases, the texture feature values regularly decrease. When in the examining process it is determined that the texture feature values produced using the inverse difference moment (IDM) show no more changes, the processing unit (3) gives out a prompt signal.

The prompt signal sent out by the processing unit (3) informs the health care professional that the stone fragmentation level has reached a predetermined threshold, so as to help the health care professionals to perform extracorporeal determination on when to stop applying shock waves.

Also provided in the present invention is a computer program product, which installs an application on a computer so as to make the computer execute the aforementioned method for determining variations among multiple three-dimensional stone images extracorporeally.

The present invention has been described with reference to the preferred embodiments and it is understood that the embodiments are not intended to limit the scope of the present invention. Moreover, as the contents disclosed herein should be readily understood and can be implemented by a person skilled in the art, all equivalent changes or modifications which do not depart from the concept of the present invention should be encompassed by the appended claims.

What is claimed is:

1. A method for determining variations among multiple three-dimensional stone images extracorporeally, which involves during a lithotripsy process performed on a human body, multiple three-dimensional stone images taken from a stone location in the human body are processed outside the human body using the following steps:

using a processing unit to execute a computing process for the multiple three-dimensional stone images one by one in an order from the first taken said image to the last taken said image, wherein the computing process involves using an entropy texture equation or an inverse difference moment (IDM) texture equation to calculate a texture feature value for each said three-dimensional stone image, in which the entropy texture equation is defined as $E=-\Sigma_{i,j}P(i,j)\log P(i,j)$, and the inverse difference moment (IDM) texture equation is defined as $$IDM = \sum_{i,j} \frac{P(i, j)}{1+(i-j)^2},$$

where $$P(i, j) = \frac{C(i, j)}{\sum_{i,j} C(i, j)},$$

and i, j are image grayscale pixel values, and C(i, j) is a number of appearances of (i, j) whenever a combination of a pitch d and an angle θ between pixels exists; and when the texture feature values calculated using the entropy texture equation or the inverse difference moment (IDM) texture equation substantively stop changing, making the processing unit output a prompt signal.

2. The method of claim 1, wherein each of the three-dimensional stone images is constructed from multiple two-dimensional ultrasonic images, and in each of the three-dimensional stone images, an effective area is selected for being processed in the computing process.

3. A computer program product, embodied on a non-transitory computer readable medium, which installs an application on a computer so as to make the computer execute the method for determining variations among multiple three-dimensional stone images extracorporeally as claimed in claim 1.

4. A computer program product, embodied on a non-transitory computer readable medium, which installs an application on a computer so as to make the computer execute the method for determining variations among multiple three-dimensional stone images extracorporeally as claimed in claim 2.

* * * * *